United States Patent
Berger et al.

(10) Patent No.: US 11,350,372 B2
(45) Date of Patent: May 31, 2022

(54) DYNAMIC PHYSICAL SIDELINK CONTROL CHANNEL GAIN

(71) Applicant: QUALCOMM Incorporated, San Diego, CA (US)

(72) Inventors: Peer Berger, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/948,002

(22) Filed: Aug. 27, 2020

(65) Prior Publication Data

US 2021/0136701 A1  May 6, 2021

Related U.S. Application Data

(60) Provisional application No. 62/929,595, filed on Nov. 1, 2019.

(51) Int. Cl.
*H04W 52/32* (2009.01)
*H04W 4/40* (2018.01)
*H04W 92/18* (2009.01)

(52) U.S. Cl.
CPC ........... *H04W 52/325* (2013.01); *H04W 4/40* (2018.02); *H04W 92/18* (2013.01)

(58) Field of Classification Search
CPC ... H04W 52/00–60; H04W 4/44; H04W 4/46; H04W 4/40; H04W 4/70; H04W 92/18
See application file for complete search history.

(56) References Cited

U.S. PATENT DOCUMENTS

| | | | | |
|---|---|---|---|---|
| 10,887,736 | B2* | 1/2021 | Lee | H04W 4/40 |
| 2018/0279259 | A1* | 9/2018 | Gulati | H04W 4/44 |
| 2018/0288589 | A1* | 10/2018 | Punithan | H04W 72/0493 |
| 2019/0104525 | A1* | 4/2019 | Santhanam | H04W 72/02 |

(Continued)

OTHER PUBLICATIONS

Huawei, et al., "Sidelink Physical Layer Procedures for NR V2X", 3GPP Draft, 3GPP TSG RAN WG1 Meeting #98bis, R1-1910059, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019 (Oct. 8, 2019), XP051809069, 30 Pages, Retrieved from the Internet: URL : https://ftp.3gpp.org/tsg_ran/WG1_RL1/TSGR1_98b/Docs/R1-1910059.zip R1-1910059 docx, [retrieved on Oct. 8, 2019], Section 5.3.

(Continued)

*Primary Examiner* — Raymond S Dean
(74) *Attorney, Agent, or Firm* — Harrity & Harrity, LLP (57) ABSTRACT

Various aspects of the present disclosure generally relate to wireless communication. In some aspects, a user equipment (UE) may increase a transmission power for a physical sidelink shared channel (PSSCH) communication based at least in part on decreasing a transmission power for a physical sidelink control channel (PSCCH) communication. The UE may transmit the PSCCH communication using the decreased transmission power for the PSCCH communication and transmit the PSSCH communication using the increased transmission power for the PSSCH communication. Numerous other aspects are provided.

28 Claims, 7 Drawing Sheets

(56) References Cited

U.S. PATENT DOCUMENTS

2019/0182859 A1* 6/2019 Khoryaev ............. H04L 1/0013
2020/0228247 A1* 7/2020 Guo ..................... H04L 1/1854

OTHER PUBLICATIONS

International Search Report and Written Opinion—PCT/US2020/070474—ISAEPO—dated Nov. 20, 2020.
VIVO: "Physical Layer Structure for NR Sidelink", 3GPP Draft, 3GPP TSG RAN WG1 #98 Meeting, R1-1908148, Physical Layer Structure for NR Sidelink Final, 3rd Generation Partnership Project (3GPP), Mobile Competence Centre, 650, Route Des Lucioles, F-06921 Sophia-Antipolis Cedex, vol. RAN WG1, No. Prague, CZ, Aug. 26, 2019-Aug. 30, 2019, Aug. 17, 2019 (Aug. 17, 2019), XP051764767, 22 Pages Retrieved from the Internet: URL: http://www.3gpp.org/ftp/tsg_ran/WG1_RL1/TSGR1_98/Docs/R1-1908148.zip, [retrieved on Aug. 17, 2019], Section 2.

\* cited by examiner

DYNAMIC PHYSICAL SIDELINK CONTROL CHANNEL GAIN

CROSS-REFERENCE TO RELATED APPLICATION

This Patent Application claims priority to U.S. Provisional Patent Application No. 62/929,595, filed on Nov. 1, 2019, entitled "DYNAMIC PHYSICAL SIDELINK CONTROL CHANNEL GAIN," and assigned to the assignee hereof. The disclosure of the prior Application is considered part of and is incorporated by reference in this Patent Application.

FIELD OF THE DISCLOSURE

Aspects of the present disclosure generally relate to wireless communication and particularly to techniques and apparatuses for dynamically setting physical sidelink control channel (PSCCH) gain.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include increasing a transmission power for a physical sidelink shared channel (PSSCH) communication based at least in part on decreasing a transmission power for a physical sidelink control channel (PSCCH) communication. The method may include transmitting the PSCCH communication using the decreased transmission power for the PSCCH communication and transmitting the PSSCH communication using the increased transmission power for the PSSCH communication.

In some aspects, a method of wireless communication, performed by a UE, may include determining a transmission power for a PSCCH communication and a transmission power for a PSSCH communication. The method may include dynamically balancing the transmission power for the PSCCH communication and the transmission power for the PSSCH communication based at least in part on one or more of a modulation and coding scheme (MCS) value, or an allocation size for the PSSCH communication.

In some aspects, a UE for wireless communication may include memory and one or more processors operatively coupled to the memory. The memory and the one or more processors may be configured to increase a transmission power for a PSSCH communication based at least in part on decreasing a transmission power for a PSCCH communication. The memory and the one or more processors may be configured to transmit the PSCCH communication using the decreased transmission power for the PSCCH communication and transmit the PSSCH communication using the increased transmission power for the PSSCH communication.

In some aspects, a UE for wireless communication may include memory and one or more processors operatively coupled to the memory. The memory and the one or more processors may be configured to determine a transmission power for a PSCCH communication and a transmission power for a PSSCH communication. The memory and the one or more processors may be configured to dynamically balance the transmission power for the PSCCH communication and the transmission power for the PSSCH communication based at least in part on one or more of an MCS value, or an allocation size for the PSSCH communication.

In some aspects, a non-transitory computer-readable medium may store one or more instructions for wireless communication. The one or more instructions, when executed by one or more processors of a UE, may cause the one or more processors to increase, a transmission power for a PSSCH communication based at least in part on decreasing a transmission power for a PSCCH communication. The one or more instructions, when executed by the one or more processors of the UE, may cause the one or more processors to transmit the PSCCH communication using the decreased transmission power for the PSCCH communication and transmit the PSSCH communication using the increased transmission power for the PSSCH communication.

In some aspects, a non-transitory computer-readable medium may store one or more instructions for wireless communication. The one or more instructions, when executed by one or more processors of a UE, may cause the one or more processors to determine a transmission power for a PSCCH communication and a transmission power for a PSSCH communication. The one or more instructions, when executed by the one or more processors of the UE, may cause the one or more processors to dynamically balance the transmission power for the PSCCH communication and the transmission power for the PSSCH communication based at least in part on one or more of an MCS value, or an allocation size for the PSSCH communication.

In some aspects, an apparatus for wireless communication may include means for increasing a transmission power for a PSSCH communication based at least in part on decreasing a transmission power for a PSCCH communication. The apparatus may include means for transmitting the PSCCH communication using the decreased transmission power for the PSCCH communication and transmitting the PSSCH communication using the increased transmission power for the PSSCH communication.

In some aspects, an apparatus for wireless communication may include means for determining a transmission power for a PSCCH communication and a transmission power for a PSSCH communication. The apparatus may include means for dynamically balancing the transmission power for the PSCCH communication and the transmission power for the PSSCH communication based at least in part on one or more of an MCS value, or an allocation size for the PSSCH communication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
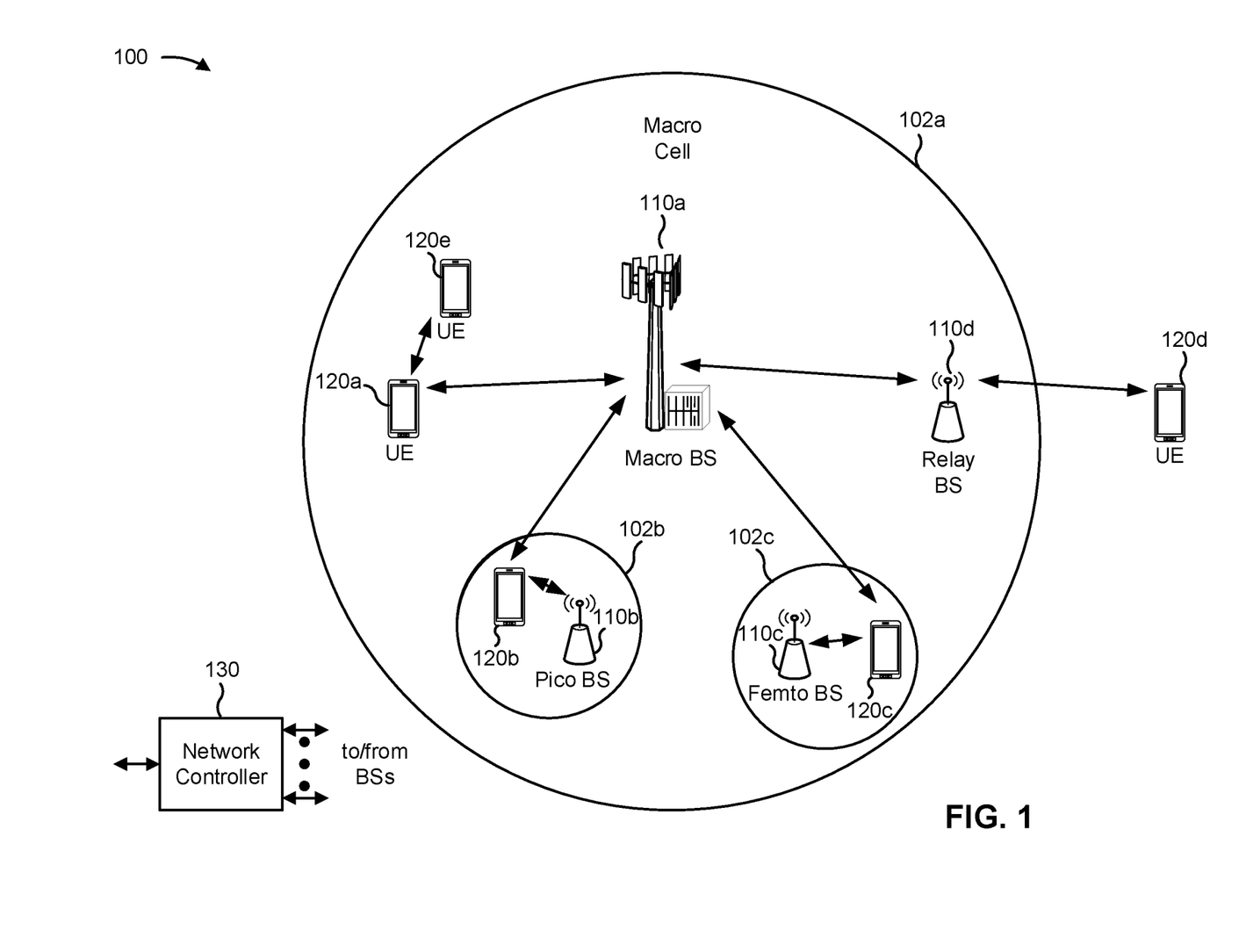
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
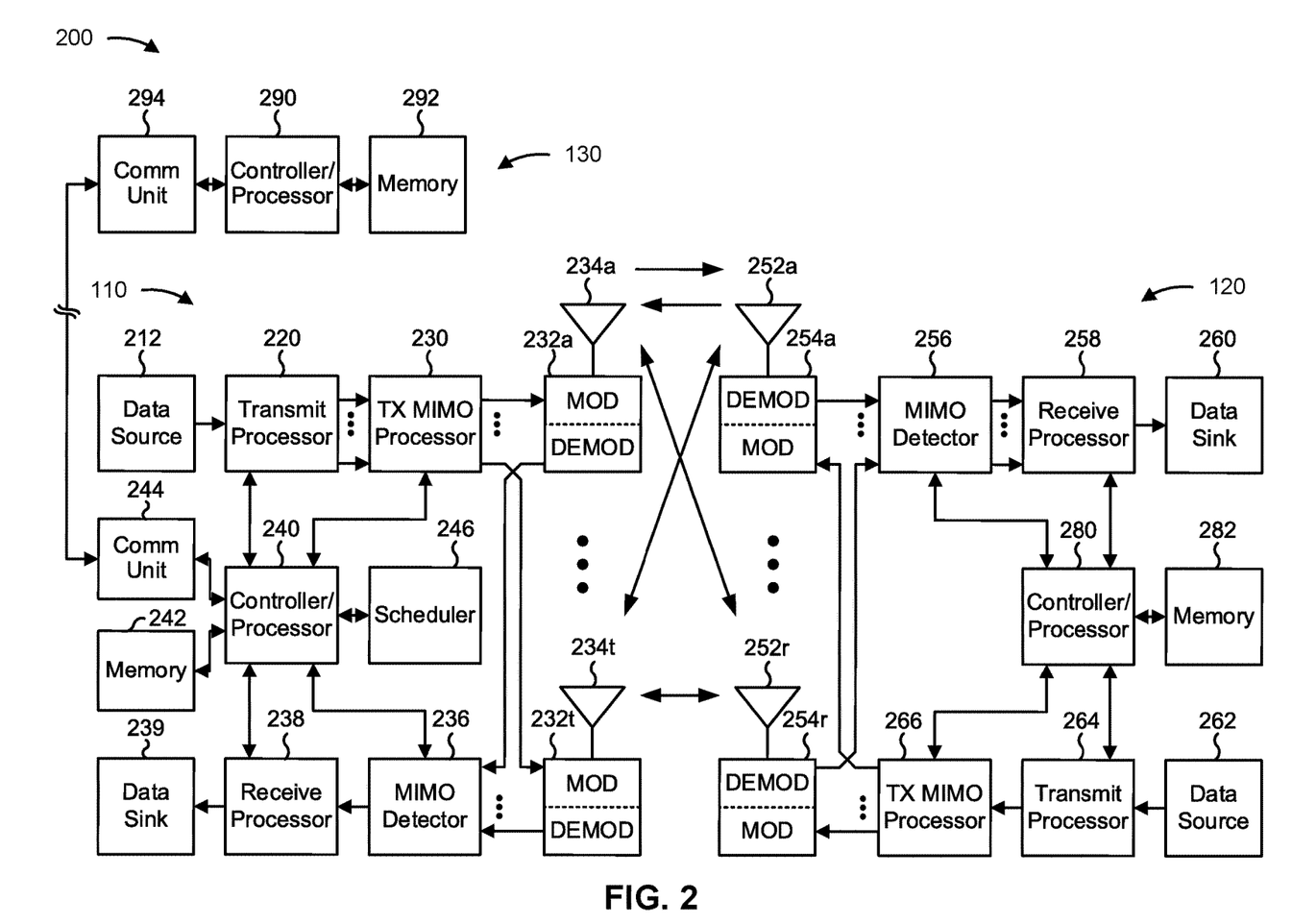
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamically setting physical sidelink control channel (PSCCH) gain for UE transmissions, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for increasing a transmission power for a physical sidelink shared channel (PSSCH) communication based at least in part on decreasing a transmission power for a PSCCH communication, means for transmitting the PSCCH communication using the decreased transmission power for the PSCCH communication and the PSSCH communication using the increased transmission power for the PSSCH communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining a transmission power for a PSCCH communication and a transmission power for a PSSCH communication, means for dynamically balancing the transmission power for the PSCCH communication and the transmission power for the PSSCH communication based at least in part on one or more of a modulation and coding scheme (MCS) value, or an allocation size for the PSSCH communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

With a goal of improving public safety and traffic efficiency on roads, standards have been developed to enable vehicles to communicate or exchange information with other vehicles. For example, an emergency vehicle may send out a special message to other vehicles on road and the other vehicles may alert the respective vehicle drivers. Vehicles may also periodically exchange their location, speed, and direction information with each other. This is referred to as vehicle-to-vehicle (V2V) communication. To make V2V possible, Institute of Electrical and Electronics Engineers (IEEE) 802.11p standard was amended to provide support for V2V, and 3GPP introduced Proximity Services (ProSe), featured in Release 12, and further enhanced ProSe in Release 14 for V2V. Vehicles may also communicate with pedestrians using vehicle-to-pedestrian (V2P) communications, communicate with infrastructure (e.g., a traffic light, a lane signal, a sensor, a traffic controller system, and/or the like) using vehicle-to-infrastructure (V2I) communications, and communicate with a network using vehicle-to-network (V2N) communications. All of these communications may be referred to generically as vehicle-to-everything (V2X) communication.

Figure 3:
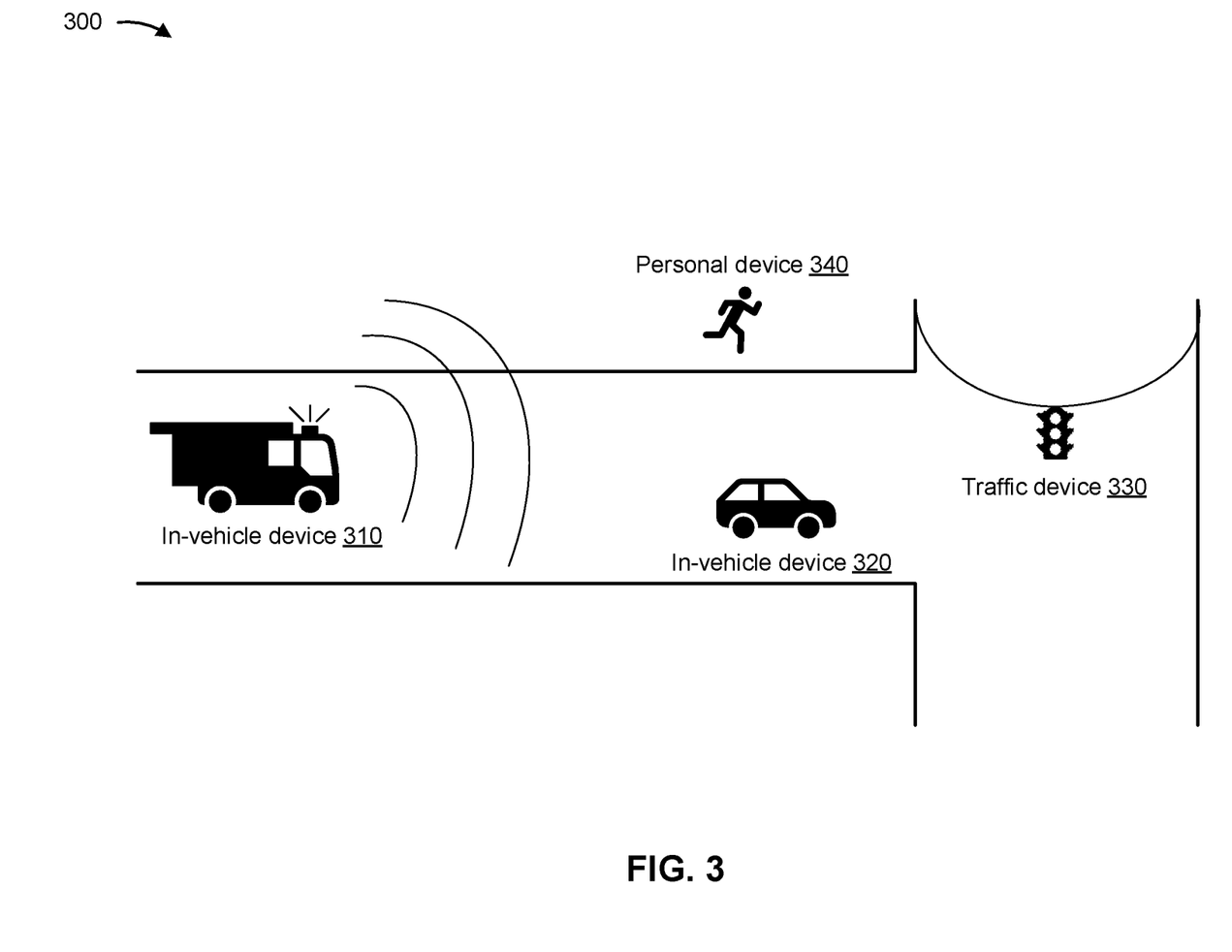
FIG. 3 is a diagram illustrating an example of vehicle-to-everything (V2X) communications.

FIG. 3 is a diagram illustrating an example 300 of V2X communications. A fire truck traveling on a road may have an in-vehicle device 310 that broadcasts messages that may be received by an in-vehicle device 320 of a car, a traffic device 330 of a traffic light in an intersection, and/or a personal device 340 of a pedestrian. For example, in-vehicle device 310 of the fire truck may broadcast a V2X communication that includes information indicating that it is an emergency vehicle and that includes information about its location, speed, and direction. In-vehicle device 320 may receive the V2X communication and provide a driver with an alert that a fire truck is traveling quickly behind the driver, so that the driver knows to get out of the way. Traffic device 330 of the traffic light in the intersection may receive the V2X communication and prepare to green light the fire truck through the intersection. Personal device 340, worn by the pedestrian, may receive the V2X communication and alert the pedestrian of the fire truck as the pedestrian approaches a pedestrian crossing at the intersection. As indicated above, FIG. 3 is provided as an example. Other examples may differ from what is described with regard to FIG. 3.

Recently, 3GPP has introduced cellular V2X (C2VX), which is growing in use. CV2X communication is based on direct communication or communication via a network. CV2X may use a sidelink interface for the direct communication. Sidelink refers to direct device-to-device (D2D) communications between devices rather than uplink communications to a base station or downlink communications from the base station.

Figure 4:
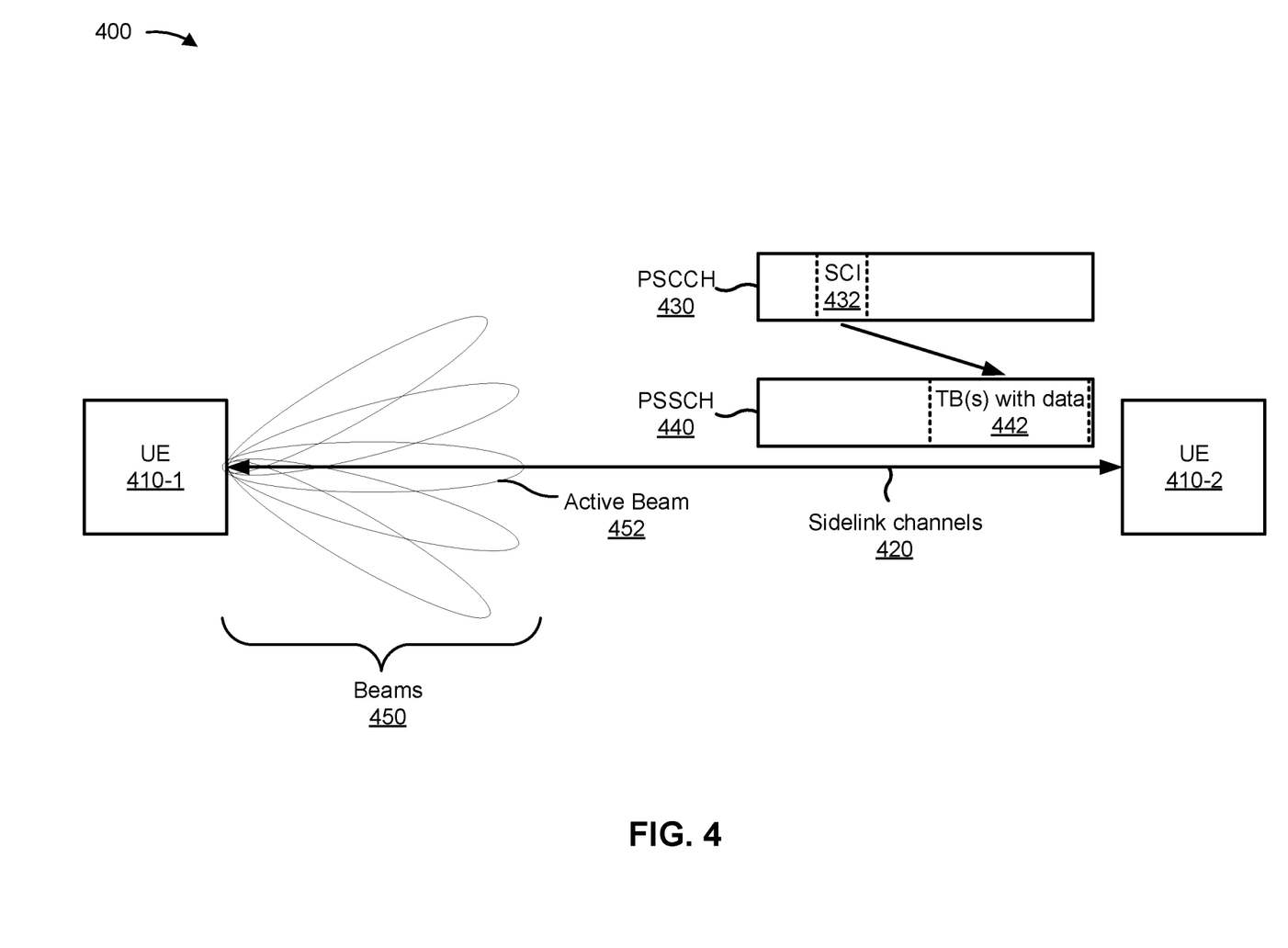
FIG. 4 is a block diagram conceptually illustrating an example of V2X communications via a sidelink channel.

FIG. 4 is a block diagram conceptually illustrating an example 400 of CV2X communications via a sidelink channel.

As shown in FIG. 4, a first UE 410-1 may communicate with a second UE 410-2 (and one or more other UEs 410) using D2D communications via one or more sidelink channels 420. In some aspects, UEs 410 may correspond to one or more other UEs described elsewhere herein, such as UE 120, in-vehicle device 310, in-vehicle device 320, traffic device 330, personal device 340, and/or the like. In some aspects, sidelink channel 420 may use a PC5 interface and/or may operate in a high frequency band (e.g., 5.9 GHz band). Additionally, or alternatively, UEs 410 may synchronize timing of transmission time intervals (e.g., frames, subframes, slots, and/or the like) using global navigation satellite system (GNSS) timing. UEs 410 may transmit V2X communications (e.g., CV2X) using sidelink channels 420.

In some aspects, CV2X transmissions may be one-to-many broadcast and/or multicast transmissions. In some aspects, CV2X transmissions may not require any physical layer feedback from receiving devices, such as acknowledgement (ACK) or negative acknowledgement (NACK) feedback. In some aspects, CV2X transmissions may be configured without retransmission. In some aspects, CV2X transmissions may be configured with a small number of retransmissions (e.g., one retransmission) that always occur (e.g., without ACK/NACK feedback).

As further shown in FIG. 4, sidelink channel 420 may include a physical sidelink control channel (PSCCH) 430 and a physical sidelink shared channel (PSSCH) 440. PSCCH 430 may be used to communicate control information, similar to a physical downlink control channel (PDCCH) and/or a physical uplink control channel (PUCCH) used for communications with a base station 110. PSSCH 440 may be used to communicate data, similar to a physical downlink shared channel (PDSCH) and/or a physical uplink shared channel (PUSCH) used for communications with a base station 110. For example, PSCCH 430 may carry sidelink control information (SCI) 432, which may indicate various control information used for sidelink communications, such as one or more resources (e.g., time, frequency, and/or beam resources) where a transport block (TB) 442 that includes data is carried on PSSCH 440 and/or other control information that may be used to assist in receiving, decoding, and/or demodulating data carried via PSSCH 440. TB 442 may include CV2X data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like. In some aspects, CV2X data may include data relevant to operation of a vehicle associated with a UE 410.

In some aspects, sidelink channels 420 may use resource pools. For example, a scheduling assignment (e.g., included in SCI 432) may be transmitted in sub-channels using specific resource blocks (RBs) across time. In some aspects, data transmissions (e.g., on PSSCH 440) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 410 may operate using transmission mode 4, where resource selection and/or scheduling is performed by UE 410 (e.g., rather than a base station 110). In some aspects, UE 410 may perform resource selection and/or scheduling by sensing channel availability for transmissions. For example, UE 410 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of CV2X communications based at least in part on such measurement(s).

Additionally, or alternatively, UE 410 may perform resource selection and/or scheduling using SCI 432 received in PSCCH 430, which may indicate occupied resources, channel parameters, and/or the like. Additionally, or alternatively, UE 410 may perform resource selection and/or scheduling by determining a channel busy rate (CBR) associated with various sidelink channels, which may be used for rate control (e.g., by indicating a maximum number of resource blocks that UE 410 can use for a particular set of subframes).

As further shown in FIG. 4, a UE 410 may communicate with other UEs 410 using one or more beams 450. For example, UEs 410 may include multiple antenna elements to support beamforming using millimeter wave beams 450 in a millimeter wave frequency band. In some aspects, UE 410 may support and/or dynamically configure different beam widths for a beam, which may change a range of beams 450 (e.g., a wider beam with a shorter range or a narrower beam with a longer range). A millimeter wave beam may be capable of higher throughput than a sub-6 GHz transmission, which may be useful for CV2X communications (e.g., to transmit camera feeds and/or the like). As shown, first UE 410-1 may communicate with second UE 410-2 using an active beam 452.

As indicated above, FIG. 4 is provided merely as an example. Other examples are possible and may differ from what is described with regard to FIG. 4.

An in-vehicle device (referred to as a UE here, for example) may transmit uplink control transmissions on a PSCCH to set up transmission of data on a PSSCH. A transmission power for a PSCCH communication and a transmission power for a PSSCH communication, added together, are limited to a predetermined total transmission power. Currently (for Releases 14 and 15), transmissions are designed such that a receiving device may decode a PSCCH communication with a better block error rate (BLER) than PSCCH transmissions. A BLER is a number of failed resource blocks out of a total number of transmitted resource blocks. The BLER for PSCCH is lower than for PSSCH because PSCCH is not supposed to be a bottleneck of transmission. Accordingly, PSCCH is normally set to a transmission gain of 3 dB over PSSCH. However, PSCCH is set to 3 dB even when it does not need to be that high. Consequently, a UE may use more transmission power than is necessary to transmit PSCCH transmissions, thereby wasting power resources. Furthermore, PSCCH gain may cause degradation in PSSCH gain, but PSSCH gain may not be increased because a total transmission power for both PSCCH and PSSCH combined is power limited. If PSSCH transmissions are degraded, a UE may be required to send retransmissions in order to successfully transmit the data. Consequently, a UE may waste battery power, and processing and signaling resources sending these retransmissions. Note that a UE normally does not receive feedback in V2X scenarios and thus the receiving UE is suffering degraded PSSCH performance and a network or other monitoring device may expend resources communicating to a transmitting UE that performance is not sufficient, for example given environmental conditions.

Some aspects herein provide techniques and apparatuses for dynamically setting a PSCCH transmission power, described here with respect to PSCCH gain, for UE transmissions. It is recognized herein that a UE may decrease a PSCCH gain and increase a PSSCH gain to provide more power for transmission of data, while not exceeding a total transmission power limitation of the UE. The UE may perform this dynamic balancing of decreasing PSCCH gain and increasing PSSCH gain while maintaining a satisfactory BLER for PSCCH. This dynamic balancing may enable the UE to increase a performance of PSSCH transmissions.

Figure 5:
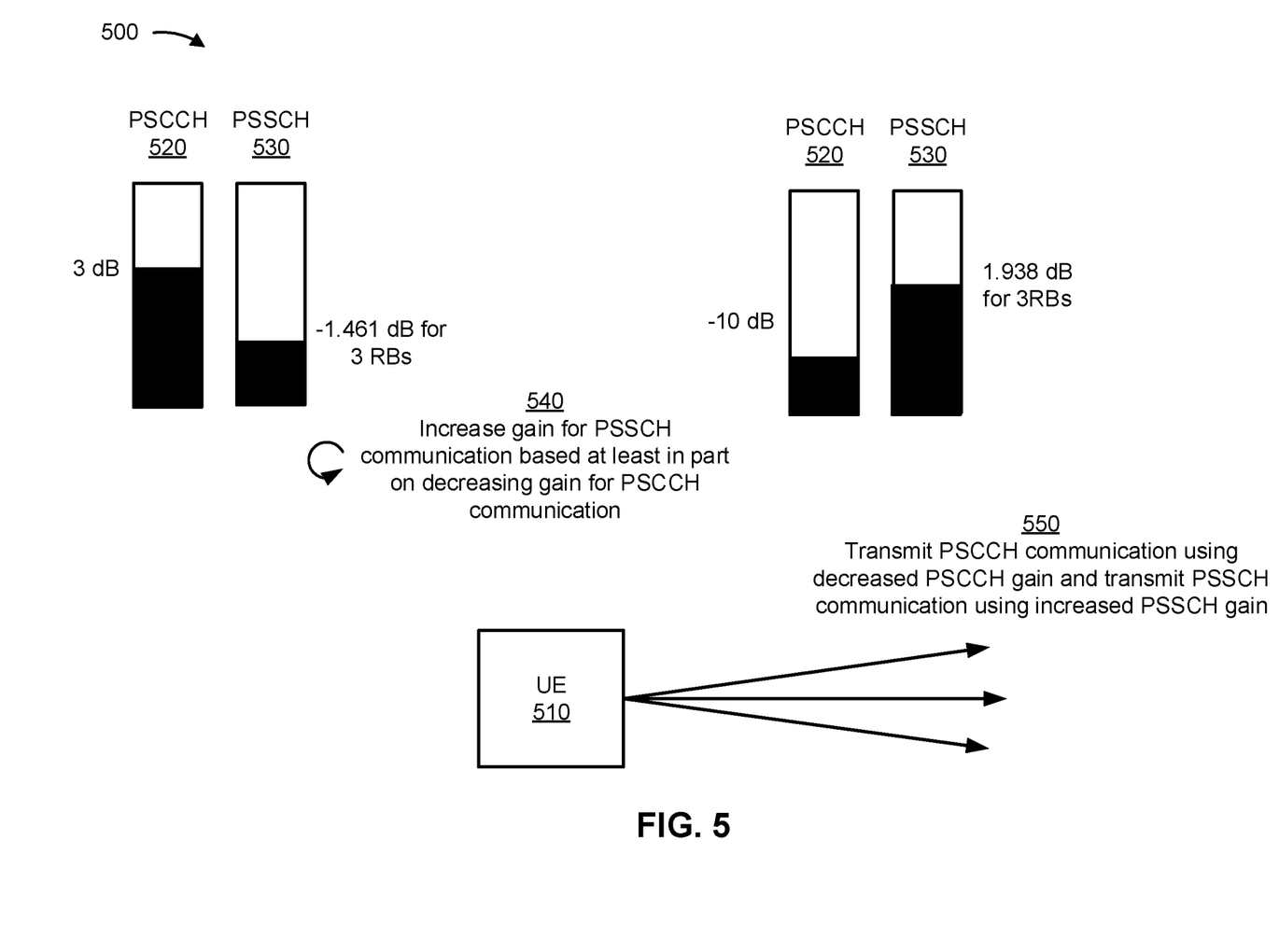
FIG. 5 is a diagram conceptually illustrating an example of V2X communications with dynamic balancing of physical sidelink control channel (PSCCH) gain and physical sidelink shared channel (PSSCH) gain, in accordance with various aspects of the present disclosure.

FIG. 5 is a diagram conceptually illustrating an example 500 of CV2X communications with dynamic balancing of PSCCH gain and PSSCH gain, in accordance with various aspects of the present disclosure.

As shown in FIG. 5, UE 510 may be configured to transmit V2X communications, such as cellular V2X (CV2X) communications. In some aspects, UE 510 may be configured to multicast or broadcast CV2X communications. To prepare for transmitting CV2X communications, UE 510 may determine a transmission power for a PSCCH communication and, based at least in part on the transmission power for the PSCCH communication, determine a transmission power for a PSSCH communication.

Transmission power may be described with respect to power gain. According to current standards, PSCCH is set to a fixed transmission power. That is, PSCCH gain 520, as shown in FIG. 5, may be set to an initial gain of 3 decibels (dB), as defined by Release 14 or 15. This is basically a doubling of a transmission power for a PSCCH communication, as compared to no gain. Due to the PSCCH gain 520 of 3 dB, PSSCH gain 530 may be, for example, −1.461.

In some aspects, transmission power for a PSCCH communication and a PSSCH communication may be represented as:

$$P \cdot (BW_{PSCCH} + BW_{PSSCH}) = (G \cdot BW_{PSCCH} + BW_{PSSCH}) \cdot P_{PSSCH}$$

where P is a transmission power (density) if a PSCCH communication and a PSSCH communication were transmitted with no gain (same gain, or G=1). $BW_{PSCCH}$ may be a bandwidth for PSCCH in terms of resource blocks (RBs). This is normally 2 RBs for a PSCCH communication, as defined by Release 14 or 15. $BW_{PSSCH}$ may be a bandwidth for PSSCH, which UE 510 may define as between 3 RBs and 96 RBs. G in this equation is a transmission gain for a PSCCH communication, and $P_{PSSCH}$ is a transmission power for PSSCH.

If gain is provided to a communication, such a change in transmission power may be represented by:

$$\Delta P[\text{dB}] = 10 \cdot \log_{10}\left(\frac{P_{PSSCH}}{P}\right) = 10 \cdot \log_{10}\left(1 - \frac{BW_{PSCCH} \cdot (G-1)}{BW_{PSSCH} + BW_{PSCCH} \cdot G}\right).$$

ΔP represents this transmission power with gain G added to a PSCCH communication. The $10 \cdot \log_{10}$ represents dB. $\Delta P_{N_{RBs}, G} = 2$ represents an initial gain of 3 dB. $\Delta P_{N_{RBs}, G_{new}}$ may represent a new PSCCH gain based at least in part on a number of RBs UE 510 allocates for a PSSCH communication. A decrease in PSCCH gain may then be represented by:

$$\text{Gain} = \Delta P_{N_{RBs}, G_{new}} - \Delta P_{N_{RBs}, G=2}.$$

Note that G=2 (linearly) corresponds to 3 dB, as 3 dB represents a doubling of transmission power.

In some aspects, UE 510 may dynamically balance PSCCH gain 520 and PSSCH gain 530. As shown by reference number 540, UE 510 may increase PSSCH gain 530 based at least in part on decreasing PSCCH gain 520. For example, as shown in FIG. 5 for an example PSCCH allocation of 3 RBs, UE 510 may decrease PSCCH gain 520 from the initial gain of 3 dB to −10 dB. Correspondingly, PSSCH gain 530 may increase from −1.461 dB (no gain) to 1.938 dB (increase of about 3.4 dB). While PSSCH gain 530 may be increased, there may be a total transmission power limitation for PSCCH gain 520 and PSSCH gain 530 combined. UE 510 may not increase PSSCH gain 530 in excess of this total transmission power limitation. As shown by reference number 550, UE 510 may transmit a PSCCH communication using a transmission power that is based at least in part on decreased PSCCH gain 520 and transmit a PSSCH communication using a transmission power that is based at least in part on increased PSSCH gain 530.

UE 510 may determine a transmission power for a PSCCH communication and a transmission power for a PSSCH communication. UE may 510 dynamically balance the transmission power for the PSCCH communication and the transmission power for the PSSCH communication based at least in part on a modulation and coding scheme (MCS) and/or an RB allocation size of the PSSCH communication. That is, there is an opportunity for UE 510 to decrease PSCCH gain 530 down from 3 dB, and use some of that spare gain to increase PSSCH gain 530, when an RB allocation size for PSCCH is smaller (e.g., 18 RBs or less) and/or MCS is higher (e.g., 17-31). For example, an RB allocation size for a PSCCH communication may consistently be 2 RBs. No more than that may be needed to convey sidelink control information (SCI). However, UE 510 may set the RB allocation size for data in a PSSCH communication between 3 RBs and 96 RBs. As the RB allocation size for a PSSCH communication decreases, UE 510 may decrease PSCCH gain 520 even further. Additionally, or alternatively, as MCS increases, UE 510 may decrease PSCCH gain 520 further.

In some aspects, a receiving UE may need a sufficiently high signal-to-noise ratio (SNR) to decode a PSCCH communication, and gain $G_{new}$ may be determined based at least in part on an SNR for an MCS value i:

$$SNR_{MCSi} - SNR_{PSCCH} > G - G_{new} = 3 - G.$$

The gain may be isolated:

$$G_{new} > 3 - (SNR_{MCSi} - SNR_{PSCCH}) [dB].$$

In linear form (instead of dB) this may be:

$$G > 10^{[(3-(SNR_{MCSi}-SNR_{PSCCH}))/10]}.$$

In some aspects, $SNR_{MCSi}$ may include retransmissions if there are any retransmissions.

In an example where the RB allocation size for PSSCH is 3 RBs and MCS is 17, UE 510 may determine a maximum spare gain for a PSCCH communication by:

$$Gain = \Delta P_{3RBs, G=PSCCH_{Gain,min}} - \Delta P_{3RBs, G=2}$$
$$< \Delta P_{3RBs, G=0} - \Delta P_{3RBs, G=2} = 2.218 - (-1.461) = 3.68 \text{ [dB]}.$$

However, UE 510 may determine an actual possible gain to use for an RB allocation size of 3 RBs (minimum allocation) with an MCS value of 17 (high MCS) by Gain=$\Delta P_{3RBs,G=0.1} - \Delta P_{3RBs,G=2}$=1.938--1.461=3.4 [dB]. In some aspects, the higher the MCS value, the more UE 510 may reduce PSCCH gain 520.

A receiving UE may need a sufficiently high SNR to decode a PSCCH communication, and an MCS with a value of 17, for example, may be high enough to provide a sufficient lower gain bound or threshold. The lower gain bound may be determined by:

$$SNR_{MCS17} - SNR_{PSCCH} > 13 \text{ [dB]}.$$

UE 510 may determine to use, for example, a PSCCH gain 520 of G=10 [dB]=0.1. This PSCCH gain 520 is acceptable since $SNR_{MCS17} - SNR_{PSCCH} > G - G_{new} = 3 - (-10) = 13$ [dB]. Therefore, with 13 dB gain as spare gain, UE 510 may lower PSCCH gain 520 and a PSCCH communication can be decoded by a receiving UE. That is, in some aspects, UE 510 may only be concerned that an MCS value is high enough, or that a gain meets a lower gain bound.

Additionally, or alternatively, UE 510 may use an MCS value as a lower bound for determining whether to even decrease PSCCH gain 520. For example, a low MCS value (e.g., 0 to 3) may allow for a much lower PSCCH gain 520 (e.g., less than 1 dB). Note that at a low MCS, such as 0, an SNR for a PSCCH communication is not much different than an SNR for a PSSCH communication. If PSCCH and PSSCH communications are decoded with a −5 SNR value, no further degradation of a PSCCH communication is possible or else the PSCCH communication will not be decoded by a receiving UE.

UE 510 may have less spare gain as the RB allocation size for a PSSCH communication increases. For example, where the RB allocation size for the PSSCH is 18 RBs: Gain=$\Delta P_{18RBs,G=0.1} - \Delta P_{18RBs,G=2}$=0.82 [dB]. In an example where the RB allocation size is 96 RBs (maximum allocation): Gain=$\Delta P_{96RBs,G=0.1} - \Delta P_{96RBs,G=2}$=0.17 [dB].

In some aspects, UE 510 may increase PSSCH gain 530 up to an amount of a PSCCH gain 520 decrease such that a total power remains the same. In the example with respect to FIG. 5, PSCCH gain 520 may decrease from 3 dB to −10 dB (13 dB decrease) and PSSCH gain 530 may increase from −1.451 dB to 1.938 dB (3.4 dB). In some aspects, UE 510 may increase PSSCH gain 530 (PSSCH gain 530 is increased as a result of decreasing PSCCH gain 520) by a same or similar amount that UE 510 decreases PSCCH gain 520. In some aspects, UE 510 may not use all of what is spare gain for a PSCCH communication. For example, UE 510 may increase PSSCH gain 530 by an amount that UE 510 decreased PSCCH gain 520, except for a back-off amount of, for example, 3 dB. Also, UE 510 may consider frequency selective interferers when determining use of the spare gain. For example, UE 510 may make a determination that a particular environment, location, or time of day may have a lot of interferers and may determine how much to decrease PSCCH gain 520 and/or increase PSSCH gain 530 based at least in part on such a determination.

In some aspects, UE 510 may dynamically balance PSCCH gain 520 and PSSCH gain 530 so as not to exceed a total power limitation of UE 510 and to maintain a BLER for PSCCH communications that is lower than a BLER for PSSCH communications (even if there are retransmissions or frequency selective interferers). However, as MCS increases in value, the BLER may be less applicable to UE 510.

UE 510 may save battery power resources by using less reception power for PSCCH based at least in part on an MCS value and/or an RB allocation size for PSSCH communications. Another advantage is that any side effects of having a lower transmission power for PSCCH may be minimal. For example, a receiving UE may not waste any resources if it receives a PSCCH communication with too little transmission power. If a receiving UE cannot decode PSSCH communications, the receiving UE may not be able to decode PSCCH and thus the receiving UE may not attempt to decode PSSCH communications, saving processing resources. Also, while decreasing the transmission power for PSCCH communications may have some influence on a channel busy rate (CBR), any such influence will be minor and may be taken into account. While PSCCH communications may have less transmission power, any influence on CBR may be negligible when CBR is high due to PSSCH communications.

Figure 6:
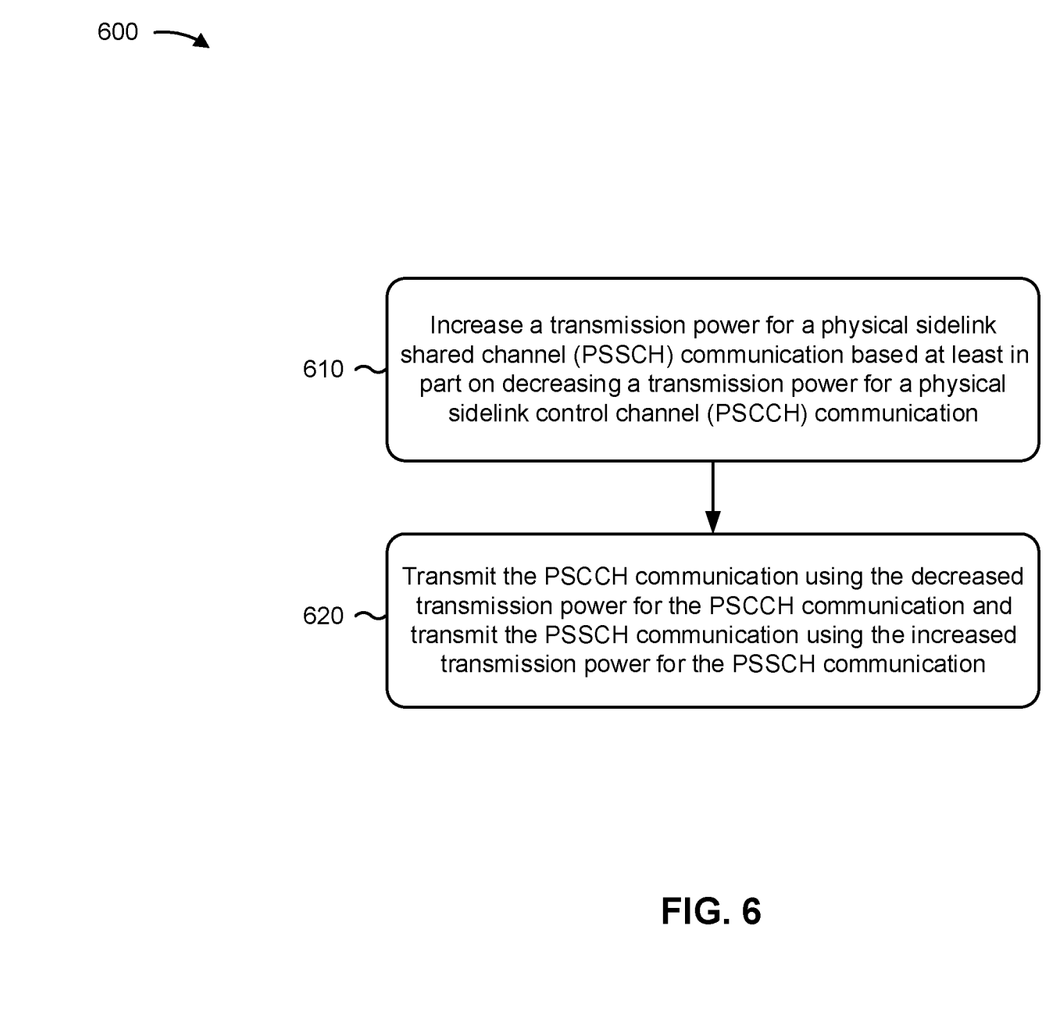
FIG. 6 is a diagram illustrating an example process for dynamically setting PSCCH gain performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120, UE 410, UE 510, and/or the like) performs operations associated with dynamic PSCCH gain.

As shown in FIG. 6, in some aspects, process 600 may include increasing a transmission power for a PSSCH communication based at least in part on decreasing a transmission power for a PSCCH communication (block 610). For example, the UE (e.g., using receive processor 258, transmit processor 264, controller/processor 280, memory 282, and/or the like) may increase a transmission power for a PSSCH communication based at least in part on decreasing a transmission power for a PSCCH communication, as described above.

As further shown in FIG. 6, in some aspects, process 600 may include transmitting the PSCCH communication using the decreased transmission power for the PSCCH communication and transmitting the PSSCH communication using the increased transmission power for the PSSCH communication (block 620). For example, the UE (e.g., using receive processor 258, transmit processor 264, controller/processor 280, memory 282, and/or the like) may transmit the PSCCH communication using the decreased transmission power for the PSCCH communication and transmit the PSSCH communication using the increased transmission power for the PSSCH communication, as described above.

Process 600 may include additional aspects, such as any single aspect or any combination of aspects described below and/or in connection with one or more other processes described elsewhere herein.

In a first aspect, increasing the transmission power for the PSSCH communication includes increasing the transmission power for the PSSCH communication based at least in part on a transmission power limitation of the UE.

In a second aspect, alone or in combination with the first aspect, transmitting the PSCCH communication and the PSSCH communication includes broadcasting CV2X messages.

In a third aspect, alone or in combination with one or more of the first and second aspects, decreasing the transmission power for the PSCCH communication includes decreasing the transmission power for the PSCCH communication based at least in part on an MCS value.

In a fourth aspect, alone or in combination with one or more of the first through third aspects, decreasing the transmission power for the PSCCH communication includes decreasing the transmission power for the PSCCH communication based at least in part on a size of a resource block allocation for the PSSCH transmission.

In a fifth aspect, alone or in combination with one or more of the first through fourth aspects, decreasing the transmission power for the PSCCH communication includes decreasing the transmission power for the PSCCH communication from a gain of 3 dB.

In a sixth aspect, alone or in combination with one or more of the first through fifth aspects, increasing the transmission power for the PSSCH communication includes increasing the transmission power for the PSSCH communication by an amount that the transmission power for the PSSCH communication decreased.

In a seventh aspect, alone or in combination with one or more of the first through sixth aspects, decreasing the transmission power for the PSCCH communication and increasing the transmission power for the PSSCH communication includes decreasing the transmission power for the PSCCH communication and increasing the transmission power for the PSSCH communication based at least in part on maintaining a constant total transmission power for both the PSCCH communication and the PSSCH communication combined.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
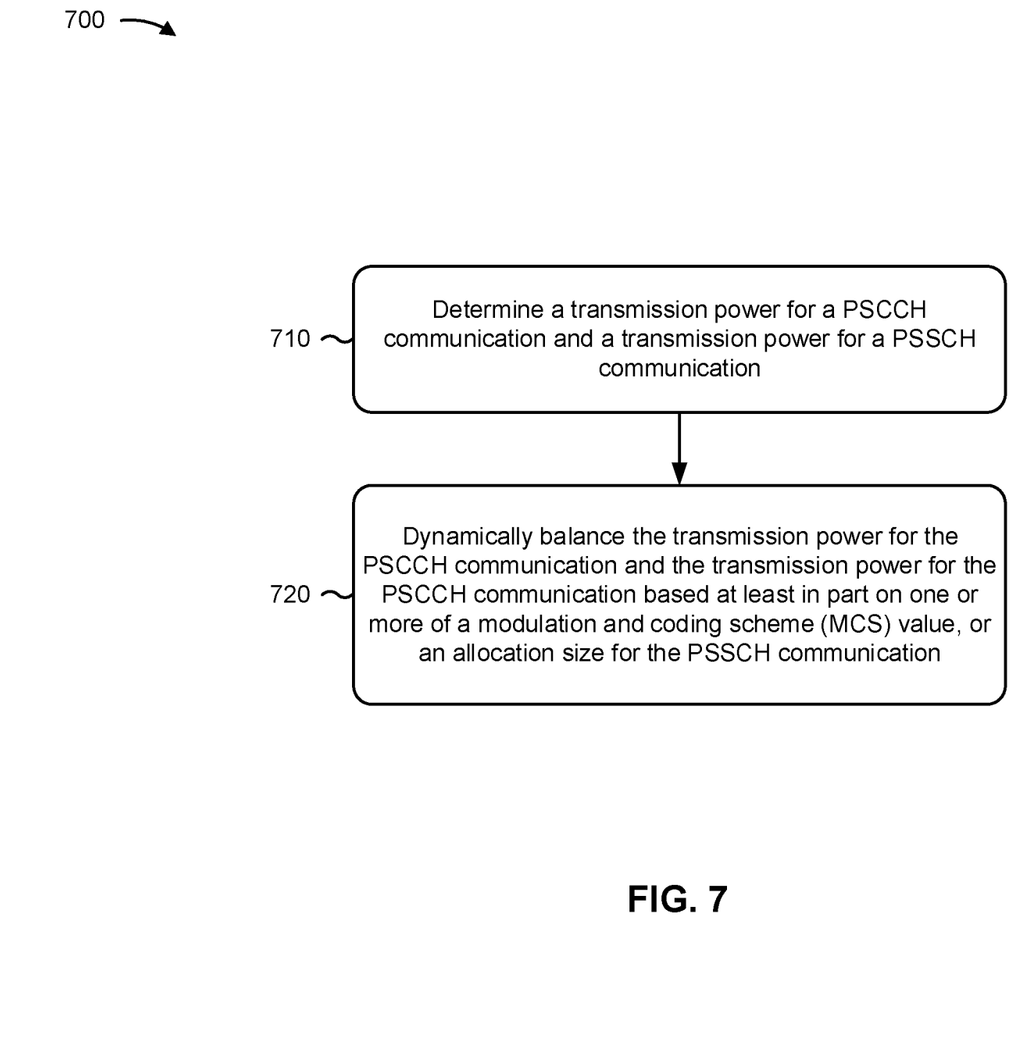
FIG. 7 is a diagram illustrating an example process for dynamically balancing PSCCH transmission power and PSSCH transmission power performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120, UE 410, UE 510, and/or the like) performs operations associated with dynamic PSCCH gain.

As shown in FIG. 7, in some aspects, process 700 may include determining a transmission power for a PSCCH communication and a transmission power for a PSSCH communication (block 710). For example, the UE (e.g., using receive processor 258, transmit processor 264, controller/processor 280, memory 282, and/or the like) may determine a transmission power for the PSCCH communication and a transmission power for the PSSCH communication, as described above.

As shown in FIG. 7, in some aspects, process 700 may include dynamically balancing the transmission power for the PSCCH communication and the transmission power for the PSSCH communication based at least in part on one or more of an MCS value, or an allocation size for the PSSCH communication (block 720). For example, the UE (e.g., using receive processor 258, transmit processor 264, controller/processor 280, memory 282, and/or the like) may dynamically balance the transmission power for the PSCCH communication and the transmission power for the PSSCH communication based at least in part on one or more of an MCS value, or an allocation size for the PSSCH communication, as described above.

Process 700 may include additional aspects, such as any single aspect or any combination of aspects described below and/or in connection with one or more other processes described elsewhere herein.

In a first aspect, dynamically balancing the transmission power for the PSCCH communication and the transmission power for the PSSCH communication includes increasing the transmission power for the PSSCH communication based at least in part on decreasing the transmission power for the PSCCH communication.

In a second aspect, alone or in combination with the first aspect, increasing the transmission power for the PSSCH communication includes increasing the transmission power for the PSSCH communication up to a same amount that the transmission power for the PSCCH communication is decreasing.

In a third aspect, alone or in combination with one or more of the first and second aspects, increasing the transmission power for the PSSCH communication includes increasing the transmission power for the PSSCH communication based at least in part on a transmission power limitation of the UE.

In a fourth aspect, alone or in combination with one or more of the first through third aspects, increasing the transmission power for the PSSCH communication based at least in part on decreasing the transmission power for the PSCCH communication includes increasing the transmission power for the PSSCH communication and decreasing the transmission power for the PSCCH communication based at least in part on maintaining a constant total transmission power for both the PSCCH communication and the PSSCH communication combined.

In a fifth aspect, alone or in combination with one or more of the first through fourth aspects, process 900 further comprises transmitting the PSCCH communication and the PSSCH communication as CV2X messages.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    increasing a transmission power for a physical sidelink shared channel (PSSCH) communication based at least in part on decreasing a transmission power for a physical sidelink control channel (PSCCH) communication based at least in part on a predetermined amount of gain associated with at least one of the PSSCH communication or the PSCCH communication; and
    transmitting the PSCCH communication using the decreased transmission power for the PSCCH communication and transmitting the PSSCH communication using the increased transmission power for the PSSCH communication.

2. The method of claim 1, wherein increasing the transmission power for the PSSCH communication includes increasing the transmission power for the PSSCH communication based at least in part on a transmission power limitation of the UE.

3. The method of claim 1, wherein transmitting the PSCCH communication and the PSSCH communication includes broadcasting cellular vehicle-to-everything (CV2X) messages.

4. The method of claim 1, wherein decreasing the transmission power for the PSCCH communication includes decreasing the transmission power for the PSCCH communication based at least in part on a modulation and coding scheme (MCS) value.

5. The method of claim 4, wherein decreasing the transmission power for the PSCCH communication includes decreasing the transmission power for the PSCCH communication based at least in part on a size of a resource block allocation for the PSSCH transmission.

6. The method of claim 1, wherein decreasing the transmission power for the PSCCH communication includes decreasing the transmission power for the PSCCH communication from a gain of 3 decibels (dB).

7. The method of claim 1, wherein increasing the transmission power for the PSSCH communication includes increasing the transmission power for the PSSCH communication by an amount that the transmission power for the PSCCH communication decreased.

8. The method of claim 7, wherein decreasing the transmission power for the PSCCH communication and increasing the transmission power for the PSSCH communication includes decreasing the transmission power for the PSCCH communication and increasing the transmission power for the PSSCH communication based at least in part on maintaining a constant total transmission power for both the PSCCH communication and the PSSCH communication combined.

9. A method of wireless communication performed by a user equipment (UE), comprising:
    determining a transmission power for a physical sidelink control channel (PSCCH) communication, and a transmission power for a physical sidelink shared channel (PSSCH) communication, based at least in part on a predetermined amount of gain associated with at least one of the PSSCH communication or the PSCCH communication; and
    dynamically balancing the transmission power for the PSCCH communication and the transmission power for the PSSCH communication based at least in part on one or more of a modulation and coding scheme (MCS) value, or an allocation size for the PSSCH communication.

10. The method of claim 9, wherein dynamically balancing the transmission power for the PSCCH communication and the transmission power for the PSSCH communication includes increasing the transmission power for the PSSCH communication based at least in part on decreasing the transmission power for the PSCCH communication.

11. The method of claim 10, wherein increasing the transmission power for the PSSCH communication includes increasing the transmission power for the PSSCH communication up to a same amount that the transmission power for the PSCCH communication is decreased.

12. The method of claim 10, wherein increasing the transmission power for the PSSCH communication includes increasing the transmission power for the PSSCH communication based at least in part on a transmission power limitation of the UE.

13. The method of claim 10, wherein increasing the transmission power for the PSSCH communication based at least in part on decreasing the transmission power for the PSCCH communication includes increasing the transmission power for the PSSCH communication and decreasing the transmission power for the PSCCH communication based at least in part on maintaining a constant total transmission power for both the PSCCH communication and the PSSCH communication combined.

14. The method of claim 9, further comprising transmitting the PSCCH communication and the PSSCH communication as cellular vehicle-to-everything (CV2X) messages.

15. A user equipment (UE) for wireless communication, comprising:
a memory; and
one or more processors, coupled to the memory, the one or more processors configured to:
increase a transmission power for a physical sidelink shared channel (PSSCH) communication based at least in part on decreasing a transmission power for a physical sidelink control channel (PSCCH) communication based at least in part on a predetermined amount of gain associated with at least one of the PSSCH communication or the PSCCH communication; and
transmit the PSCCH communication using the decreased transmission power for the PSCCH communication and transmit the PSSCH communication using the increased transmission power for the PSSCH communication.

16. The UE of claim 15, wherein the one or more processors, to increase the transmission power for the PSSCH communication, are configured to increase the transmission power for the PSSCH communication based at least in part on a transmission power limitation of the UE.

17. The UE of claim 15, wherein the one or more processors, to transmit the PSCCH communication and the PSSCH communication, are configured to broadcast cellular vehicle-to-everything (CV2X) messages.

18. The UE of claim 15, wherein the one or more processors, to decrease the transmission power for the PSCCH communication, are configured to decrease the transmission power for the PSCCH communication based at least in part on a modulation and coding scheme (MCS) value.

19. The UE of claim 18, wherein the one or more processors, to decrease the transmission power for the PSCCH communication, are configured to decrease the transmission power for the PSCCH communication based at least in part on a size of a resource block allocation for the PSSCH transmission.

20. The UE of claim 15, wherein the one or more processors, to decrease the transmission power for the PSCCH communication, are configured to decrease the transmission power for the PSCCH communication from a gain of 3 decibels (dB).

21. The UE of claim 15, wherein the one or more processors, to decrease the transmission power for the PSSCH communication, are configured to increase the transmission power for the PSSCH communication by an amount that the transmission power for the PSCCH communication decreased.

22. The UE of claim 21, wherein the one or more processors, to decrease the transmission power for the PSCCH communication and increasing the transmission power for the PSSCH communication, are configured to decrease the transmission power for the PSCCH communication and increase the transmission power for the PSSCH communication based at least in part on maintaining a constant total transmission power for both the PSCCH communication and the PSSCH communication combined.

23. A user equipment (UE) for wireless communication, comprising:
a memory; and
one or more processors, coupled to the memory, the one or more processors configured to:
determine a transmission power for a physical sidelink control channel (PSCCH) communication and a transmission power for a physical sidelink shared channel (PSSCH) communication based at least in part on a predetermined amount of gain associated with at least one of the PSSCH communication or the PSCCH communication; and
dynamically balance the transmission power for the PSCCH communication and the transmission power for the PSSCH communication based at least in part on one or more of a modulation and coding scheme (MCS) value, or an allocation size for the PSSCH communication.

24. The UE of claim 23, wherein the one or more processors, to dynamically balance the transmission power for the PSCCH communication and the transmission power for the PSSCH communication, are configured to increase the transmission power for the PSSCH communication based at least in part on decreasing the transmission power for the PSCCH communication.

25. The UE of claim 24, wherein the one or more processors, to increase the transmission power for the PSSCH communication, are configured to increase the transmission power for the PSSCH communication up to a same amount that the transmission power for the PSCCH communication is decreased.

26. The UE of claim 24, wherein the one or more processors, to increase the transmission power for the PSSCH communication, are configured to increase the transmission power for the PSSCH communication based at least in part on a transmission power limitation of the UE.

27. The UE of claim 24, wherein the one or more processors, to increase the transmission power for the PSSCH communication based at least in part on decreasing the transmission power for the PSCCH communication, are configured to increase the transmission power for the PSSCH communication and decrease the transmission power for the PSCCH communication based at least in part on maintaining a constant total transmission power for both the PSCCH communication and the PSSCH communication combined.

28. The UE of claim 23, wherein the one or more processors are further configured to transmit the PSCCH communication and the PSSCH communication as cellular vehicle-to-everything (CV2X) messages.

* * * * *